United States Patent Office 2,981,691
Patented Apr. 25, 1961

2,981,691

DETERGENT COMPOSITION

William C. York, deceased, late of Westbury, N.Y., by Ruth M. York, administratrix, Mineola, and Lloyd I. Osipow, Monsey, N.Y., assignors to W. R. Grace & Co., a corporation of Connecticut No Drawing. Filed Oct. 27, 1958, Ser. No. 769,571

14 Claims. (Cl. 252—137)

In summary this invention is directed to detergent compositions comprising urea and a compound characterized by the structural formula:

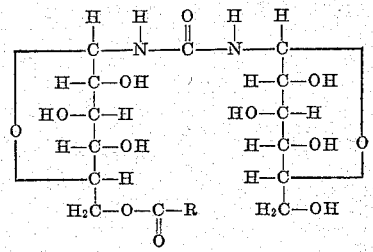

In the above formula, R is a hydrocarbon residue of the formula $C_nH_m$ where $n$ is an integer of at least 7 and not more than 23 and $m$ is an integer in the range between $2n-3$ and $2n+1$ inclusive. Thus, R is an alkyl, alkenyl or alkadienyl radical having from 7 to 23 carbon atoms. It is obvious that the product of the above formula is the same whether the acyl moiety is substituted on the 6 or 6' position. Generically, the compounds are described as the mono fatty acid esters of diglucose ureide. Processes for their preparation are disclosed in our copending application, S.N. 663,580, filed June 5, 1957, now U.S. Patent No. 2,903,445. Typical of such esters suitable for use in the present invention include the caprylate pelargonate, caprate, undecanoate, laurate, tridecanoate, myristate, pentadecanoate, palmitate, margarate, stearate, nonadecanoate, arachidate, heneicosanoate, behenate, tricosanoate, lignocerate, oleate, palmitoleate, petroselinate, erucate, linoleate, eleosterate, and the like. Suitable esters also include mixtures of those enumerated hereabove. For example, the diglucose ureide esters of coconut oil, palm oil, tall oil, olive oil, soybean oil and tung oil are also operative for purposes of the present invention.

These esters are prepared by an alcoholysis reaction between diglucose ureide and an ester of a fatty acid of the general formula:

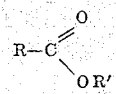

R has the meaning hereinbefore described. R' is an organic moiety. In a preferred embodiment of our invention R' is a lower alkyl radical; i.e., up to and including hexyl. The lower alkyl esters of the fatty moieties of the above formula are suitable for the alcoholysis reaction, since they result in the formation of an alcohol sufficiently volatile to permit its removal from the reaction mixture by simple distillation as the reaction progresses. Since alcoholysis is an equilibrium reaction, it follows that some diglucose ureide mono ester is formed whether or not the by-product alcohol is separated. Thus, any organic ester of a fatty acid is suitable in the present process including those such as glycerides which are less volatile than the solvent selected for the reaction medium. However, if the alcohol is not volatile, the reaction will proceed only until equilibrium conditions are established. The reaction is shown below in Equation 1.

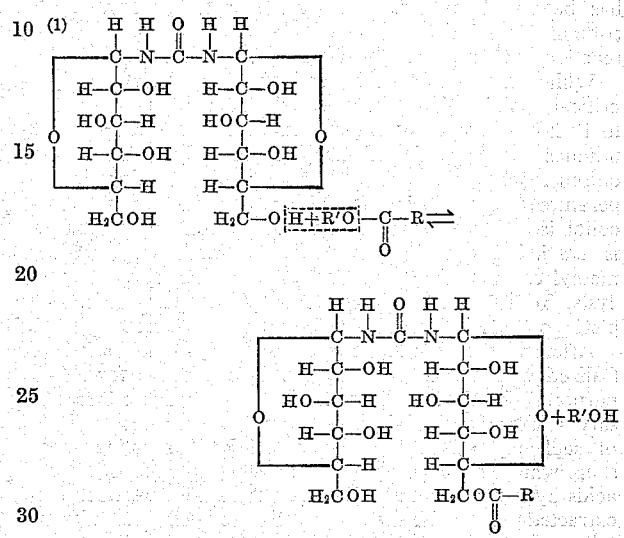

From the above equation, it is evident that the equilibrium will shift to the right if the alcohol is removed as it is formed. Consequently, the reaction is faster if esters of the more volatile alcohols are used. Under the preferred conditions of temperature and pressure, the alcohol can be conveniently stripped free of the reaction mixture by using reduced pressure to aid distillation of the alcohol thereform or by blowing an inert gas through or over the surface of the reaction mixture. Furthermore, a large surface area will favor stripping of the product alcohol. A number of different types of film evaporators are commercially available, and these can be used with vacuum or an inert gas.

Suitable solvents for the alcoholysis reaction are those which will dissolve both diglucose ureide and the starting ester without preferential reaction with either of the products or the reactants. Preferably we use dimethylsulfoxide.

The reaction is effectively catalyzed by an alkaline catalyst. By the term "alkaline catalyst" we mean a basic organic salt or a salt of a metal selected from groups I, II or IV of the periodic table and a weak acid. Proton-accepting metals such as tin and zinc are also embraced by the term "alkaline catalyst." Likewise, quaternary ammonium bases and similar compounds are effective for this purpose. Exemplary catalysts include sodium hydroxide, potassium hydroxide, sodium carbonate, sodium methoxide, potassium ethoxide, trisodium phosphate, lithium hydroxide, magnesium hydroxide and lead oxide. Alkali metal hydroxides, alcoholates, carbonates and phosphates are the preferred catalysts. The corresponding alkaline earth compounds are also suitable.

The general procedure for preparing the monofatty esters of diglucose ureide is as follows: A quantity of diglucose ureide is admixed with a lower alkyl ester of a fatty acid in mutual solvent. We have already indicated that sulfoxides, e.g., dimethylsulfoxide, are preferred solvents. The resulting solution may be placed in a container equipped with a vacuum sealed stirrer and a fractionating column. The solution is then heated, preferably to a temperature of about 60–95° C. under a reduced pressure of about 5 to 50 mm. Hg absolute for one hour to remove the major portion of any moisture that may be present. A quantity of catalyst (preferably moisture free) is added to this solution and the temperature thereof is maintained at about 60–95° C. under an absolute pressure of about 5–50 mm. Hg. During the reaction some of the solvent is distilled off along with most of the by-product alcohol formed by the alcoholysis reaction. If desired, the reaction may be stopped at a convenient time to replace the amount of solvent which has been distilled off. With an efficient fractionating column, the solvent will be returned automatically to the reaction mixture, thus obviating such a step.

While the time of the reaction is not particularly critical, we find it preferable to let it continue from 1 to 12 hours. Actually, some product is formed in a few minutes at the preferred temperature range. The required reaction time will depend upon the reaction temperature and the efficiency with which the product alcohol is stripped from the system. When the reaction is carried out under preferred conditions, e.g., with methyl esters at 95% C. and potassium carbonate catalysts, from 1 to 5 hours is generally adequate for complete conversion into the diglucose ureide ester.

After the reaction is stopped the catalyst can be neutralized with any acid. Acetic acid is effective for this purpose. While the neutralization step is not a necessary feature in obtaining the ester products, the purity of such products can be enhanced by converting the soap, which is invariably formed in the reaction, to fatty acids by neutralization. The fatty acids are subsequently extracted from the reaction mixture using standard laboratory techniques. Purification methods will be discussed in greater detail infra.

The entire reaction is preferably carried out under anhydrous conditions, since we have found that the presence of several percent of water may result in reduced yields. A slight amount of moisture is not excessively deleterious, ince moisture initially present in such quantities is rapidly removed by distillation. In effect, the reaction is carried out under substantially anhydrous conditions.

The quantity of catalyst required to effectively promote the reaction is in the range of 0.05–0.30 mole per mole of starting ester. In the preferred embodiment about 0.15 mole of catalyst are used. High levels of catalyst produce excessive amounts of soap which in turn decreases the purity of the ultimate product. Using low levels, the alcoholysis reaction is slowed considerably.

The effective mole ratio of diglucose ureide to fatty acid ester for obtaining the ester compounds in good yield is generally about 3 to 1 however, such a mole ratio is not absolutely critical and some degree of variation may be tolerated. If the mole ratio of diglucose ureide to fatty acid ester is less than about 3 to 1, more highly substituted esters of diglucose ureide are also formed. However, lower ratios of diglucose ureide to fatty acid ester may be employed and the resulting mixture of mono or higher acyl derivatives can be subsequently separated.

The alcoholysis reaction can be carried out over a wide temperature range. We have previously indicated that the reaction rate is more rapid at elevated temperatures. However, degradation of the diglucose ureide and discoloration of the ultimate product is more pronounced as the temperature of the system is increased. Consequently, we prefer to carry out the reaction in the range of about 60–95° C. The volatility of the alcohol formed during the reaction is an important criterion for choosing an operating temperature within the preferred range.

We have mentioned that stripping alcohol from the system is facilitated by using a reduced pressure. We have found, as a matter of practice, that a reduced pressure of about 5 to 10 mm. Hg absolute represents a preferred range. However, a greater range of pressures of less than atmospheric is operable.

The ester products are obtained from the solvent as crude crystalline masses. They may be used as such or they may be further purified by various procedures readily apparent to those skilled in the art. On a commercial scale, several methods of purification are feasible. If the reaction is carried out using a substantial excess of diglucose ureide (to avoid formation of multi-substituted esters), the preferred purification technique is as follows: At the completion of the reaction, the mixture is neutralized to convert soap to fatty acids. The solution is then extracted with an aliphatic hydrocarbon solvent, such as hexane or heptane, to remove free fatty acids and unreacted ester. A water-immiscible solvent such as n-butanol is then added to the solution, which is then solvent-extracted with an aqueous sodium chloride solution to remove the reaction solvent, unreacted diglucose ureide, and other water-soluble impurities. The butanol solution is then carbon treated to remove color, and distilled. A steam distillation will remove the last traces of butanol. If more highly substituted esters of glucose ureide are present in the reaction mixture, the hexane treatment is preferably omitted. The reaction mixture is neutralized, partitioned between n-butanol and salt solution, washed further with salt solution, and the solvents removed by distillation. The mono ester can then be recovered by precipitation from any one of a number of polar solvents, such as acetone or methanol.

A pure sample may be obtained conveniently by absorption chromatography. A chromatographic column may be prepared by packing a quantity of a mixture containing 3 parts by weight Florex XXX (hydrated sodium aluminum silicate of the fuller's earth type) and 1 part by weight of Celite 545 (diatomaceous earth) into a glass tube to give a long adsorbent column that is small in diameter. A portion of the sample to be chromatographed is dissolved in a solvent mixture composed of equal parts of methanol and benzene. The column is pre-wetted with this same solvent mixture and then the solution containing the sample is added to the top of the column. After this solution has flowed below the top level of the column, fresh solvent is added and the column is eluted with a quantity of the solvent mixture (benzene-methanol, 1:1). Fractions are collected at the bottom of the column and evaporated to dryness. Usually, about 5 of the fractions collected contain the major portion of the sample. The central fraction is generally considered to be the purest of the 5 fractions; this fraction may be characterized by determining its melting point, specific rotation, and chemical composition.

Working examples for the preparation of representative mono fatty acid esters of diglucose ureide are given elsewhere in the specification.

The diglucose ureide monofatty esters made by the foregoing process are effective as cleaning agents per se, as mentioned in our copending S.N. 663,580. The instant invention is based on our discovery that these esters form combinations with urea to produce even better detergents.

It is well known, of course, to combine a surface active agent possessing good detergent properties with an alkali salt of a weak inorganic acid, a neutral inorganic salt, e.g., an alkali metal salt of a strong inorganic acid, and a deflocculating agent to produce a detergent composition. However, the effectiveness of a particular composition depends upon balance between the above ingredients and furthermore, the interaction between the active agent and the building materials. We have discovered such an improved combination. The diglucose ureide mono-fatty ester detergents, when combined in proper portion with urea with or without additional building materials, form a truly superior detergent composition which is astonishingly effective both in hard and soft water. The basic composition may be varied to provide novel detergent compositions effective for both light duty and heavy duty purposes.

It is, therefore, an object of the present invention to provide novel detergent compositions which represent a marked improvement in the field of nonionic built detergents.

In one embodiment of our novel composition, we have found it useful to incorporate a substantial portion of inorganic water soluble phosphate with the ester-urea mixture. Phosphates which are suitable include, but are not limited to, sodium tripolyphosphate, tetrasodium pyrophosphate, trisodium orthophosphate and sodium hexametaphosphate. In preparing our heavy duty detergent compositions we prefer to use a substantial portion of sodium tripolyphosphate. For heavy duty detergency the percentage of inorganic phosphates in the composition may vary from about 10 to 80%. We find that the preferred range is about 20–60%. Alkali metal silicates also are effective as building materials in addition to urea for the purposes of the present invention. Suitable compounds within this category include sodium silicate and sodium metasilicate pentahydrate. The silicates in solution undergo hydrolysis to give a pH of about 11.2. In our compositions we may have from about 5–25% of the alkali metal silicate although the preferred quantity is from about 10–15%. A sodium salt of a strong inorganic acid is an important building material for our novel detergent compositions. Such a salt does not hydrolyze but it dissociates to a sufficient extent to provide sodium ion in the detergent solution. For a light duty detergent where a less alkaline medium is desired we find that sodium sulfate in quantities from about 50–85% is desirable. 15–50% of this material is generally incorporated in our novel heavy duty detergents. A small quantity of an alkali metal carbonate such as sodium carbonate is also desirable as a building material. While the diglucose ureide monoesters tend to act per se as dispersants or deflocculents, we have found that it is desirable to bolster their natural propensity to defloculate by the addition of a minor portion ranging from about 0.1 to 2% of sodium carboxymethyl cellulose.

The amount of diglucose ureide monoester in the detergent composition is generally minor in proportion to the weight of the builders. Generally, the proportion of the monoester to urea with or without other builders ranges from about 1:49 to about 1:1. Under preferred conditions the ester comprises from about 15–30% by weight of the total composition. The optimum amount of this active ingredient will vary according to the specific building materials, the contemplated field of application, and the manner of use.

The urea is suitably used in a ratio of 1–49 parts of urea per part of ester, whether or not other builders are used. Preferably the urea/ester ratio is 1 to 4:1. When other builders are used (in addition to urea) they are suitaby used in a ratio of 0.5 to 2 parts of such builder (or builders, if more than one additional builder is used) to 1 part of combined urea and ester.

The general procedures for preparing our novel compositions are as follows. Urea, with or without other builders may be added to the ester to form a hot aqueous slurry containing from about 40–60% solids concentration. This mixture is vigorously stirred to form a smooth and homogeneous paste. If a slurry is desired, the urea and any other additives may be dissolved in a suitable solvent and added to a slurry of the monoester. The urea and other builders may also be incorporated in the detergent composition by a post treatment of dried detergent particles.

Thereafter these compositions may be prepared in forms of solutions, pastes, or as dry, partially hydrated solid products, preferably in a finely divided condition. If a solution of the detergent composition is prepared it may be subjected to suitable drying operations and converted into particulate form. The mixture may be then spray dried, drum dried, or roll dried.

In order for a composition to be an excellent detergent, it must have (1) ability to wet and spread on liquid and solid surface, (2) ability to form a stable foam, (3) ability to emulsify oily materials, (4) ability to peptize aggregates of solid particles, and (5) ability to de-deflocculate or stabilize disperse systems of solid particles. The diglucose ureide monoesters possess these characteristics to a measurable extent. However, as an active agent in the detergent compositions described herein, these desirable properties of the esters are considerably enhanced. We have observed a tendency of the alkaline building material to cause saponification by a cleavage of fatty esters within the detergent solutions during use.. The soap thus formed is disposed of within the soil which is being removed by the detergent. Builders by themselves are not particularly effective emulsificants. The presence of the diglucose ureide esters and the saponification products resulting from chemical reaction within the detergent solution causes our novel built compositions to have superior emulsification properties. This is especially important in carrying away the water insoluble inert organic material such as hydrocarbon oils, asphalt and tar from the surface of the material to be cleaned. The ability to disperse and defloculate soil particles possessed by our novel esters is supplemented by the presence of sodium carboxymethyl cellulose in our novel heavy duty detergents. Because of this property our novel compositions effectively sequester calcium and magnesium ions in hard water and prevent redeposition of their soaps on the surface of the material being treated.

All references to weight percents of compounds or solids employed refer to weight percent of the compounds resulting after evaporation of the water used (if any) during the detergent formation procedure.

Specific esters suitable for use in this invention may be prepared as set forth in the following Examples 1–7.

EXAMPLE I

*Diglucose ureide laurate*

A reaction apparatus was assembled by equipping a 3-necked flask with a stirrer and a 10-bulb fractionating column leading to a receiver. This flask was charged with 1.5 liters of dimethyl sulfoxide, 384 g. (1 mole) of diglucose ureide and 71 g. (0.33 mole) of methyl laurate. The solution was heated to 90° C. under a pressure of 15 mm. Hg absolute for one hour to remove any moisture that may have been present. A 7 g. portion of potassium carbonate was added. The solution was then heated with stirring at 90° C. for 12 hours under a pressure of 15 mm. Hg absolute. After the first 6 hours of reaction, approximately 700 ml. of distillate had been collected. A 700 ml. portion of fresh dimethyl sulfoxide was added to the reaction mixture and distillation was continued for an additional 6 hours.

The solution was cooled, neutralized with acetic acid and filtered to remove a small quantity of diglucose ureide which precipitated during the cooling process. The clear filtrate, approximately 900 ml., was diluted with 1 liter of butanol and 1 liter of concentrated saline solution. The butanol layer was decolorized with activated carbon and distilled to a thick residue. This residue was dissolved in 400 ml. of hot ethanol. The solution was then cooled and diluted with 1 liter of acetone. The resulting solution was chilled to minus 10° C. to precipitate 68 g. of product. The crude product contained 3.59% nitrogen (theory 4.96%) and 29.5% lauric acid equivalent (35.4%). One recrystallization of this material from ethanol gave a product containing 4.6% nitrogen.

The novel product was purified by adsorption chromatography, according to the procedure set forth in the specification, supra. It melted at 204–212° C. and had a specific rotation of $$[\alpha]\frac{22° \text{ C.}}{D} = +17.83°$$

in dimethyl sulfoxide. A sample was analyzed and the composition checked with theory as follows: percent carbon, theory 53.0, found 52.45; percent hydrogen, theory 8.2, found 8.20; percent oxygen, theory 34.0, found 35:15; percent nitrogen, theory 4.96, found 4.94. The structural formula of the diglucose ureide laurate is shown hereunder:

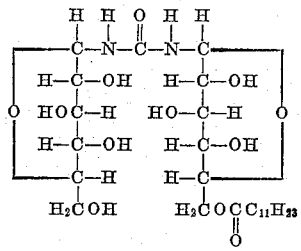

EXAMPLE II

Diglucose ureide myristate

The procedure of Example I was substantially repeated using 81 gm. (0.33 mole) of methyl myristate in lieu of the methyl laurate. A 60 g. yield of diglucose ureide myristate was thereby obtained. After purification by adsorption chromatography the residual product was found to have a melting point of 190–195° C. and a specific rotation of $$[\alpha]\frac{22° \text{ C.}}{D} = +21.2°$$

in dimethyl sulfoxide. Upon analysis the following results were obtained: percent carbon, theory 54.3, found 53.70; percent hydrogen, theory 8.4, found 8.17; percent oxygen, theory 32.2, found 32.84; and percent nitrogen, theory 4.7, found 4.99.

EXAMPLE III

Diglucose ureide palmitate

The procedure of Example I was substantially repeated using 90 g. (0.33 mole) of methyl palmitate in lieu of the methyl laurate. A 81 gm. yield of diglucose ureide palmitate was thereby obtained. This crude material had a specific rotation of $$[\alpha]\frac{22° \text{ C.}}{D} = +19.7°$$

It contained 4.21% nitrogen (theory 4.5%) and 39.76% palmitic acid equivalent (41.0%) after purification by adsorption chromatography. The novel product thus purified was found to have a melting point of 205–208° C. and a specific rotation of $$[\alpha]\frac{22° \text{ C.}}{D} = +17.29°$$

in dimethyl sulfoxide. Upon analysis of the purified product the following results are obtained: percent carbon, theory 56.0, found 55.5; percent hydrogen, theory 8.7, found 8.43; percent oxygen, theory 30.9, found 31.68; and percent nitrogen, theory 4.5, found 4.37.

EXAMPLE IV

Diglucose ureide stearate

The procedure of Example I was substantially repeated using 100 g. (0.33 mole) of methyl stearate in lieu of methyl laurate. A 78 g. yield of diglucose ureide stearate was thereby obtained. This crude material had a specific rotation of $$[\alpha]\frac{25° \text{ C.}}{D} = +18.8°$$

It contained 3.85% nitrogen (theory 4.33%) and 32.55% stearic acid equivalent (theory 43.6%). After purification by adsorption chromatography the novel product was found to have a melting point of 190–200° C. and a specific rotation of $$[\alpha]\frac{22° \text{ C.}}{D} = +16.61°$$

in dimethyl sulfoxide. Upon analysis the following results were obtained: percent carbon, theory 57.2, found 58.16; percent hydrogen, theory 8.93, found 9.11; percent oxygen, theory 29.5, found 29.27; and percent nitrogen, theory 4.32, found 4.03.

EXAMPLE V

Diglucose ureide oleate

The procedure of Example I was substantially repeated using 100 g. methyl oleate in lieu of methyl laurate. A 75 g. yield of diglucose ureide oleate was thereby obtained. This crude product had a specific rotation of $$[\alpha]\frac{25° \text{ C.}}{D} = +16.4°$$

After purification by adsorption chromatography the novel product was found to have a melting point of 160–170° C. and a specific rotation of $$[\alpha]\frac{22° \text{ C.}}{D} = +17.8°$$

in dimethyl sulfoxide. Upon analysis the following results are obtained: percent carbon, theory 57.40, found 55.30; percent hydrogen, theory 8.64, found 8.42; percent oxygen, theory 29.63, found 25.83; and percent nitrogen, theory 4.32, found 4.69.

EXAMPLE VI

Diglucose ureide cocoate

The procedure of Example I was substantially repeated using 81 g. (0.33 mole) of methyl cocoate in lieu of the methyl laurate. A 42 g. yield of diglucose ureide cocoate was thereby obtained. The "cocoate" comprises methyl esters of coconut oil fatty acid containing about 5.4 caprylate, 8.4 caprate, 45.4 laurate, 18 myristate, 10.5 palmitate, 2.3 stearate, 7.5 oleate, 0.8 caproate, 0.4 arachidate, and 0.4% palmitoleate.

EXAMPLE VII

Diglucose ureide tallowate

The procedure of Example I was substantially repeated using 100 g. methyl tallowate in lieu of methyl laurate. A 62 g. yield of diglucose ureide tallowate was thereby obtained. The "tallowate" is a mixture of tallow fatty acid methyl esters containing about 6.3 myristate, 27.4 palmitate, 14.1 stearate, 49.6 oleate, and 2.5% octadecadienoate.

The following Examples VIII–XIX disclose procedures for preparing the novel urea-ester detergent compositions of this invention.

EXAMPLE VIII

A detergent composition was prepared by forming a slurry containing about 20 parts diglucose ureide laurate as prepared in Example I and 80 parts urea dispersed in about 67 parts of water. The slurry was agitated vigorously at a temperature of about 60° C. to form a homogeneous mixture. It was then dried with heated air at a temperature of about 120° C. The thus dried homogeneous mixture was recovered as a powder which possessed excellent detersive properties in both hard and soft water.

EXAMPLE IX

Following the procedure of Example VIII a powdered homogeneous detergent composition was prepared containing on a solids basis about 20 parts diglucose ureide tallowate as prepared in Example VII and 80 parts urea. The thus formed detergent composition possessed good detersive and foaming properties in both hard and soft water. The resultant detergent is especially effective for heavy duty; viz: treating, e.g., soiled cotton.

EXAMPLE X

A mixture of 20 parts diglucose ureide tallowate (prepared in Example VII), 40 parts borax, and 40 parts urea was heated until the urea melted, stirred until substantially homogenous, then cooled and pulverized. The powder was found to be a good detergent.

EXAMPLE XI

Following the procedure in Example X a detergent composition was prepared comprising 20 parts diglucose ureide laurate as prepared by the procedure in Example I, 40 parts borax and 40 parts urea. The detergent properties of the thus formed composition were of high grade.

EXAMPLE XII

A detergent composition was prepared by forming an aqueous slurry containing on a solids basis 20 parts diglucose ureide tallowate, 40 parts borax, 40 parts urea, and about 67 parts water. The slurry was agitated at a temperature of about 70° C. to form a homogeneous mixture for about 1 hour and thereafter dried with heated air at a temperature of about 125° C. The thus dried mixture showed a good grade of detersive properties.

EXAMPLE XIII

A detergent composition containing on a solids basis 20 parts diglucose ureide laurate, 40 parts borax and 40 parts urea was prepared by the procedure set out in Example XII. The thus prepared detergent composition exhibited a high grade of detersive properties in both hard and soft water.

EXAMPLE XIV

A composition for use as a detergent was prepared by forming a slurry containing about 20 parts diglucose ureide tallowate, 40 parts sodium tripolyphosphate, 40 parts urea, and about 67 parts water. After vigorous agitation for 30 minutes at 60° C. to insure homogeneity, the slurry was air dried at a temperature of about 125° C. The thus formed composition displayed excellent detersive properties in both hard and soft water.

EXAMPLE XV

A detergent composition was prepared as per the procedure in Example XIV containing on a solids basis about 20 parts diglucose ureide laurate, 40 parts sodium tripolyphosphate, and 40 parts urea. The thus formed detergent composition exhibited excellent detersive properties on testing.

EXAMPLE XVI

A detergent composition was prepared by charging 25 parts diglucose ureide laurate and 75 parts urea to a ball mill for dry milling. After about 1 hour the homogeneously ground detergent composition (100% minus 60 mesh) was discharged. On testing, the thus formed detergent composition showed good detersive properties.

EXAMPLE XVII

Following the procedure set forth in Example XVI a detergent composition containing 25 parts diglucose ureide tallowate and 75 parts urea was obtained. A high grade of detersive properties resulted upon testing therefor.

EXAMPLE XVIII

A detergent composition was prepared by forming a slurry containing 20 parts diglucose ureide laurate as prepared in Example I, 20 parts sodium tripolyphosphate, 20 parts urea, 40 parts sodium sulfate, and about 67 parts water. The slurry was agitated at a temperature of about 60° C. to insure homogeneity for a period of about 30 minutes. The slurry was air dried at about 125° C. Upon testing excellent detergent properties resulted from the thus formed detergent composition.

EXAMPLE XIX

A composition for use as a detergent containing on a solids basis 20 parts diglucose ureide tallowate, 20 parts sodium tripolyphosphate, 20 parts urea, and 40 parts sodium sulfate was prepared by the procedure of Example XVIII. The resultant detergent composition showed a high grade of detersive properties.

EXAMPLE XX

*Detergency evaluation*

The following experiment was conducted to ascertain the effectiveness of diglucose ureide esters in combination with urea with or without other builders in detergent systems. Additionally comparison runs were made to evaluate the urea-ester detergent composition with other known detergent builders.

A sample of "Foster D. Snell" ("FDS") soiled cotton was selected for the evaluation of the detergents. This test sample was prepared by treating de-sized Indian Head cotton fabric in a soiling mixture containing 28.4% carbon, 35.8% coconut oil, 17.9% coconut oil fatty acids and 17.9% mineral oil suspended in carbon tetrachloride. The Indian Head cotton fabric was dipped into the suspension, air-dried and rinsed lightly in water to remove loosely adherent soil. It was again air-dried.

Detergents were compared by running simultaneous wash tests in a standard laboratory detergency testing machine, e.g., Launderometer. This machine rotates twenty jars end-over-end in a bath of fixed temperature. In each jar are placed standard soiled cloths, wash solution and rubber balls to provide "load." The test method gives useful comparative results provided, of course, that the detergents to be compared are run simultaneously and portions of the same batch of standard cloth are used.

For check runs, the same series is repeated a second time and a third time. The values for each detergent can be averaged and incidental variables will largely cancel out when the averages are compared. Such a system is called a group experiment. The test conditions used are shown below in Table 1.

TABLE 1
TEST CONDITIONS

| | |
|---|---|
| Amount of solution per jar | 100 ml. |
| Mechanical washing assistants | 8 rubber balls ⅜" dia. |
| Temperature | 60° C. |
| Speed of rotation of jars | 40 R.P.M. |
| Time for washing | 15 minutes. |
| Rinsing procedure | Rotate two minutes with 150 ml. of water of same hardness as wash water. |
| Fabrics per jar | Two swatches of "FDS" soiled cotton 3 x 2 inches. |
| Reflectance reading | By a standard reflectance meter, e.g., a Hunter multipurpose reflectometer set to read 100 on magnesia block. |

Detergency data were obtained in both hard water of a hardness equivalent to 15 U.S. grains and soft water of a hardness equivalent to 2 U.S. grains. A U.S. grain of hardness is equivalent to 17.1 parts per million of calcium carbonate.

The composition of the various built detergents tested is shown in Table 2 along with the resulting reflectance gain of the soiled swatches subsequent to a wash in the different detergent compositions and a rinse. The weight percent (i.e., 0.2 and 0.35%) of built detergent composition added to the water is comparable to amounts used in households and commercial laundermats.

Ultrawet K is a commercial grade of sodium alkylaryl sulfonate commonly used in built-detergent compositions. Buildings "A" and "B" are representative of commercial compositions. It will be observed that when Ultrawet K is used with buildings "A" and "B" detergency is particularly good, while it is substantially poorer with buildings "C," "D," "E," and "F," particularly at the lower concentration—0.2%.

Renex 30, a tridecyl alcohol-ethylene oxide condensate, is considered to be one of the best nonionic detergents. It will be observed that it is relatively unaffected by the type of building.

The diglucose ureide esters, on the other hand, are greatly influenced in their performance by the type of building used. Maximum detergency results when urea is employed as the builder. This is important, because urea is considerably cheaper than the commonly used polyphosphates. The effect of urea in enhancing the detergency of the diglucose ureide esters appears to be unique, and is surprising in view of its rather neutral effect with other active agents.

In Table 3, urea, monoglucose ureide, diglucose ureide, and borax are compared as builders, generally with or without sodium tripolyphosphate. The test conditions were the same as those used to obtain the results in Table 2 except that all tests were made in water having a hardness of 15 U.S. grams.

TABLE 3
COTTON LAUNDEROMETER TEST RESULTS BRIGHTNESS UNITS GAINED

| | G | H | I | J | K | L | M | N | O |
|---|---|---|---|---|---|---|---|---|---|
| Active agent | 20 | 20 | 20 | 20 | 20 | 20 | 20 | 20 | 20 |
| Urea | 80 | | | | 40 | 40 | | | |
| Borax | | 80 | | | 40 | | 40 | | |
| Sodium tripolyphosphate | | | | | | 40 | 40 | 40 | 40 |
| Monoglucose ureide | | | 80 | | | | | 40 | |
| Diglucose ureide | | | | 80 | | | | | 40 |

| Active agent | Built detergent conc., percent | G | H | I | J | K | L | M | N | O |
|---|---|---|---|---|---|---|---|---|---|---|
| Diglucose ureide laurate | 0.2 | 7.1 | 4.5 | 8.7 | 9.3 | 6.0 | 8.6 | 7.8 | 7.4 | 6.7 |
| | 0.35 | 10.8 | 10.3 | 9.9 | 11.1 | 9.7 | 17.4 | 14.2 | 14.8 | 14.5 |
| Diglucose ureide tallowate | 0.2 | 9.3 | 2.7 | 8.7 | 9.2 | 4.4 | 9.3 | 6.6 | 8.1 | 9.8 |
| | 0.35 | 13.9 | 12.1 | 13.6 | 14.5 | 12.8 | 22.7 | 19.0 | 20.5 | 19.7 |

A controlled test was made to evaluate two urea ester detergent compositions in comparison to a nonionic built detergent sold commercially as "All." The test conditions used are shown below in Table 4.

TABLE 2
COTTON LAUNDEROMETER TEST RESULTS BRIGHTNESS UNITS GAINED AT 60° C. WITH 0.2% AND 0.35% BUILT DETERGENT

| | A | B | C | D | E | F |
|---|---|---|---|---|---|---|
| Active agent | 25 | 25 | 25 | 25 | 25 | 25 |
| Sodium tripolyphosphate | 40 | | | | | |
| Tetrasodium pyrophosphate | 10 | 50 | | | | |
| Borax | | | 75 | | | |
| Sodium sulfate | 15 | 15 | | | | |
| Sodium carbonate | | | | 75 | | |
| Sodium metasilicate, pentahydrate | 10 | 10 | | | | |
| "N" silicate | | | | | 75 | |
| Urea | | | | | | 75 |

| Active agent | Water hardness, gr. | 0.35 | 0.2 | 0.35 | 0.2 | 0.35 | 0.2 | 0.35 | 0.2 | 0.35 | 0.2 | 0.35 | 0.2 |
|---|---|---|---|---|---|---|---|---|---|---|---|---|---|
| Diglucose ureide laurate | 2 | 7.5 | 5.5 | 8.2 | 6.1 | 13.7 | 11.5 | 5.4 | 4.1 | 7.8 | 4.9 | 14.9 | 16.6 |
| | 2 | 8.5 | 7.6 | 8.7 | 5.9 | 17.1 | 12.3 | 3.8 | 2.6 | 7.1 | 4.0 | 18.5 | 11.2 |
| | 15 | 7.9 | 5.7 | 7.5 | 3.4 | 9.8 | 4.9 | 5.0 | 3.9 | 3.7 | 3.5 | 14.4 | 14.1 |
| Diglucose ureide tallowate | 2 | 15.1 | 10.8 | 13.6 | 8.6 | 11.2 | 9.4 | 8.3 | 3.0 | 7.9 | 3.9 | 13.5 | 12.7 |
| | 15 | 14.0 | 5.6 | 10.1 | 5.5 | 11.4 | 9.1 | 4.2 | 3.0 | 2.7 | 1.4 | 11.9 | 11.7 |
| Ultrawet K | 2 | 21.9 | 17.7 | 23.1 | 15.3 | 19.1 | 3.6 | 20.2 | 6.3 | 11.2 | 4.3 | 5.6 | 1.8 |
| | 15 | 24.3 | 15.1 | 26.4 | 14.7 | 12.6 | 4.4 | 22.1 | 9.0 | 10.9 | 4.2 | 6.5 | 2.7 |
| Renex 30 | 2 | 10.5 | 10.2 | 9.9 | 9.6 | 9.1 | 7.0 | 7.4 | 5.6 | 8.2 | 7.7 | 8.9 | 7.8 |
| | 15 | 9.7 | 8.5 | 9.9 | 9.3 | 8.2 | 5.8 | 7.6 | 4.7 | 8.2 | 6.9 | 8.4 | 6.8 |

TABLE 4
TEST CONDITIONS

| Test Equipment | Launder-Ometer |
| --- | --- |
| Amount of solution per jar | 100 ml. |
| Mechanical washing assistants | 8 rubber balls ⅜" diameter. |
| Temperature | 60° C. |
| Speed of rotation of jars | 40 R.P.M. |
| Time for washing | 15 minutes. |
| Rinsing procedure | Rotate two minutes with 150 ml. of water of same hardness as wash water. |
| Fabrics per jar | Two swatches of "FDS" soiled cotton 3 x 2 inches. |
| Reflectance reading | By a standard reflectance meter, e.g., Hunter multipurpose relectometer set to read 100 on magnesia block. |

Following the rinse operation each swatch was placed between two paper towels and passed once through a wringer. The swatches were then dried at 65±2° C. for a constant length of time to insure complete and equal drying. The swatches were conditioned overnight at 50% relative humidity and two Hunter reflectance measurements were made using a green filter. Detergency measurements were made on Foster D. Snell soiled cotton (reflectance 22.0 for an unwashed swatch). A run was made to establish a control on an unwashed FDS soiled cotton swatch in distilled water to set a basis from which the effect of the detergent compositions could be measured. Distilled water was also used in all evaluation tests herein for making up detergent solutions, water of varying hardness, for rinsing, etc.

In all runs soiled swatches were chosen so that they had an initial reflectance of 22.0±1 units. Tests were then made in a random order, with test swatches not being added to any given detergent solution until it had reached the test temperature. Detergency tests were initiated immediately after addition of the swatches to the Launderometer. After the washing, rinsing and drying were completed, reflectance measurements were made as soon as possible thereafter to find the gain in reflectance over the initial reflectance of 22.0±1 units. The results of the comparative detergents are set forth in Table 5 below.

TABLE 5

| Built detergent | Gain in reflectance units | | |
| --- | --- | --- | --- |
|  | No detergent—distilled water only | 0.20% detergent | 0.35% detergent |
| Control | 2.0 |  |  |
| P [1] |  | 4.1 | 12.0 |
| Q [2] |  | 9.9 | 9.7 |
| "All" [3] |  | 4.7 | 6.2 |
| Compositions (Weight percent) at time of test. |  |  |  |

[1] Diglucose ureide laurate 25%, urea 75%.
[2] Diglucose ureide tallowate 25%, urea 75%.
[3] Sodium tripolyphosphate 37.7%, sodium carbonate 24.6%, sodium silicate (1:3.25) 8.3%, sodium carboxymethylcellulose 0.8%, nonionic surfactant (tall oil-ethylene oxide condensate) 15.6% and moisture 13.0%.

We claim:

1. A detergent composition consisting essentially of urea and a mono fatty acid ester of diglucose ureide wherein the acyl moiety attached to the glucose group of the ester contains from 8 to 24 carbon atoms in a 1 to 49:1 weight ratio respectively.

2. The detergent composition of claim 1 wherein the ester is a member of the group consisting of diglucose ureide laurate, diglucose ureide tallowate, diglucose ureide cocoate, diglucose ureide stearate, diglucose ureide palmitate, diglucose ureide oleate and diglucose ureide myristate.

3. The detergent composition of claim 1 in which the ester is 20 to 50% by weight of combined ester and urea.

4. The detergent composition of claim 3 wherein the ester is a member of the group consisting of diglucose ureide laurate, diglucose ureide tallowate, diglucose ureide cocoate, diglucose ureide stearate, diglucose ureide palmitate, diglucose ureide oleate and diglucose ureide myristate.

5. A detergent composition consisting essentially of urea and a mono fatty acid ester of diglucose ureide wherein the acyl moiety attached to the glucose group of the ester contains from 8 to 24 carbon atoms in a 1 to 49:1 weight ratio respectively and at least one member of the group consisting of 10–80% of an alkaline water soluble alkali phosphate, 15–85% sodium sulfate and up to 50% sodium tetraborate by weight, the balance of said composition being the urea and ester.

6. A detergent composition consisting essentially of urea and a mono fatty acid ester of diglucose ureide wherein the acyl moiety attached to the glucose group of the ester contains from 8 to 24 carbon atoms in a 1 to 49:1 weight ratio respectively and 10 to 50% sodium tripolyphosphate and 15–50% sodium sulfate by weight, the balance of said composition being the urea and ester.

7. A detergent composition consisting essentially of urea and a mono fatty acid ester of diglucose ureide wherein the acyl moiety attached to the glucose group of the ester contains from 8 to 24 carbon atoms in a 1 to 49:1 weight ratio respectively and at least one member of the group consisting of 10 to 80% sodium tripolyphosphate, 15–85% sodium sulfate and up to 50% sodium tetraborate by weight, the balance of said composition being the urea and ester.

8. A detergent composition consisting essentially of urea and a mono fatty acid ester of diglucose ureide wherein the acyl moiety attached to the glucose group of the ester contains from 8 to 24 carbon atoms and up to 50% sodium tetraborate by weight, the balance being the urea and ester in which the ester is 20 to 50% by weight of the combined urea and ester.

9. A detergent composition comprising 20% diglucose ureide laurate, 40% urea and 40% sodium tetraborate by weight.

10. A detergent composition comprising 20% diglucose ureide tallowate, 40% urea, and 40% sodium tetraborate by weight.

11. A detergent composition comprising 20% diglucose ureide laurate, 40% urea, and 40% sodium tripolyphosphate by weight.

12. A detergent composition comprising 20% diglucose ureide tallowate, 40% urea, and 40% sodium tripolyphosphate by weight.

13. A detergent composition comprising 20% diglucose ureide laurate, 20% urea, 20% sodium tripolyphosphate, and 40% sodium sulfate by weight.

14. A detergent composition comprising 20% diglucose ureide tallowate, 20% urea, 20% sodium tripolyphosphate, and 40% sodium sulfate by weight.

References Cited in the file of this patent
UNITED STATES PATENTS

| 2,738,333 | Goldsmith | Mar. 13, 1956 |
| --- | --- | --- |
| 2,814,612 | Desty et al. | Nov. 26, 1957 |

FOREIGN PATENTS

| 496,832 | Canada | Oct. 13, 1953 |
| --- | --- | --- |
| 523,264 | Belgium | Oct. 31, 1953 |